United States Patent [19]

Rush

[11] 4,022,580
[45] May 10, 1977

[54] CATALYST ACTIVATION

[75] Inventor: Elton E. Rush, Bartlesville, Okla.

[73] Assignee: Phillips Petroleum Company, Bartlesville, Okla.

[22] Filed: Sept. 9, 1975

[21] Appl. No.: 611,744

Related U.S. Application Data

[62] Division of Ser. No. 357,642, May 7, 1973, Pat. No. 3,931,045.

[52] U.S. Cl. .............................. 23/288 B; 23/288 S; 34/57 R; 55/302
[51] Int. Cl.² ....................... B01J 8/00; B01J 37/12; F26B 17/00; B01D 46/04
[58] Field of Search .......... 23/288 B, 288 S, 288 R; 252/411 R, 416, 417, 418; 55/158, 302; 48/DIG. 5

[56] References Cited

UNITED STATES PATENTS

| | | | |
|---|---|---|---|
| 1,685,759 | 9/1928 | Walter | 23/288 R X |
| 2,387,454 | 10/1945 | Marisic | 23/288 R X |
| 2,390,708 | 12/1945 | Hemminger | 252/418 |
| 2,429,751 | 10/1947 | Gohr et al. | 55/302 X |
| 2,494,554 | 1/1950 | Harlow | 48/DIG. 5 |
| 2,875,847 | 3/1959 | Pring | 23/288 S |
| 2,892,510 | 6/1959 | Wygant | 55/302 X |
| 3,339,341 | 9/1967 | Maxwell et al. | 55/158 X |
| 3,615,256 | 10/1971 | Miller et al. | 55/302 X |
| 3,716,971 | 2/1973 | Reinauer | 55/302 X |
| 3,856,475 | 12/1974 | Marx | 55/158 X |

*Primary Examiner*—Morris O. Wolk
*Assistant Examiner*—Roger F. Phillips

[57] ABSTRACT

Solid comminuted catalytic materials are activated by passing an activating stream through a shallow deposit of such materials on a porous substrate, characterized in that the catalyst particles are in a quiescent state during contact with the activating stream.

4 Claims, 2 Drawing Figures

FIG. 1

CATALYST ACTIVATION

This is a division of application Ser. No. 357,642, filed May 7, 1973, now U.S. Pat. No. 3,931,045.

This invention relates to catalytic processes. More particularly, this invention relates to a method for activation of catalysts, especially solid olefin polymerization catalysts.

Many solid catalyst compositions, such as those employed in hydrocarbon conversion operations, e.g., polymerization, cracking, dehydrogenation, hydrogenation, and the like, require for maximum effectiveness an activation treatment which comprises subjecting the raw catalyst to elevated temperatures for an interval of time, while passing over the catalyst a stream of fluid which is inert, nonoxidizing, nonreducing, oxidizing, reducing, dry, or the like, depending on the particular nature of the catalyst and its intended use. One of the objects of such treatment is the removal of moisture from the catalyst, since water is a catalyst poison in many applications.

In their simpler form, catalyst activation processes comprise drying and heating an activating fluid such as air and passing it through a catalyst bed at a constant rate until the catalyst reaches the desired temperature, at which point the temperature of the activating fluid is stabilized and the catalyst is held at the activation temperatures for the proper length of time. However, solid catalyst compositions are often relatively impermeable, thus requiring a shallow bed in order to obtain the required flow of activating fluid. The bed thus becomes large and expensive.

In order to at least alleviate the deficiencies encountered in activating solid particulate catalysts, including the continuous removal of impurities and catalyst poisons from the activation zones and temperature control of the bed, fluidized activation processes have been developed. In these processes, the catalyst is heated by contacting it while in a fluidized state with a stream of activating fluid at elevated temperatures. While such fluidized activation processes do provide activated catalysts having distinct advantages over catalysts which have been activated by passing the heated activating fluid through a fixed deep bed of catalyst particles, such processes do have several shortcomings. For example, fluidized bed activation results in abrasion and attrition of the particles, which not only results in a loss of catalyst, at times in excess of 50 percent, but may also affect the productivity, i.e., pounds of product produced per pound of catalyst employed, and, as well, the molecular weight of the polymer. The catalyst is also affected by the manner in which the activating fluid contacts the catalyst. Generally, a high air/catalyst space velocity is desired, but if the air distributor under the bed does not properly fluidize the bed, large bubbles and spouts will occur in the bed and part of the bed may even be settled and stationary with very little air flow through these regions. Other disadvantages include the high investment and capital equipment, high fuel requirements for heating, larger equipment size, heavy weight, and the necessity to safely dispose of large volumes of very hot air, entrained catalyst fines, catalyst poisons and the like. Thus, it is evident that there is a need for improved methods of activating said particulate catalytic materials.

It is an object of this invention to provide a process for activating solid catalysts.

It is another object of this invention to provide a process for activating solid olefin polymerization catalysts.

It is another object of this invention to provide a process for activating water-sensitive catalysts.

It is another object of this invention to provide a process for activating chromium oxide-based polymerization catalyst, particularly such catalysts as are employed in the polymerization of monoolefins.

These and other objects, aspects, and advantages of the invention will be apparent from a study of the disclosure, drawings, and appended claims.

In accordance with the present invention, there has been discovered an improved process for activating solid catalytic materials, particularly water-sensitive catalytic materials, and more especially, such catalytic materials which are suitable for the polymerization of monoolefins.

More particularly, in accordance with the present invention, solid particulate catalytic materials are activated by a process comprising contacting a shallow settled bed or deposit of catalyst particles with a heated stream of activating fluid at activation temperatures for a period of time sufficient to activate the catalyst for its intended activity and thereafter recovering or collecting the activated catalyst.

Further, in accordance with the present invention, there is provided an apparatus suitable for shallow bed activation of solid catalytic materials.

The process of the present invention can be readily applied to the activation of any solid particulate catalytic material, regardless of type and regardless of the activating fluid. More particularly, the present invention is suited for the activation of particulate metal oxide catalytic materials, especially such catalytic materials as are employed in polymerization reactions.

Catalytic materials which are especially advantageously activated in accordance with this invention are supported monoolefin polymerization catalysts comprising chromium, at least a portion of which is in the hexavalent form such as chromium trioxide. Such chromium-containing catalysts and their use as polymerization, particularly monoolefin polymerization, catalysts are well known. A representative method of preparing such catalysts is disclosed in U.S. Pat. No. 2,825,721, the disclosure of which is incorporated herein by reference. As set forth in said patent, such supported chromium oxide catalysts can be prepared by depositing chromium oxide (e.g., $Cr_2O_3$) or a chromium compound calcinable to chromium oxide, on a suitable support and activating to leave part of the chromium on the support in the hexavalent form. The support can be selected from one or more of the following members: silica, alumina, thoria, zirconia, silica-alumina, silica-thoria, silica-zirconia, acid-treated clays, and other materials generally known in the art as catalyst supports. In its preferred form, the catalyst is a silical gel-supported chromium oxide, wherein at least a portion of said chromium is in the hexavalent state.

As previously noted, the solid particulate catalysts are activated in accordance with the present invention by heating the particulate catalyst at activation temperature for a specified period of time. After such activation, the catalyst is cooled, purged with an inert gas, and collected in a dry container. The activation is accomplished solely by heating the bed or deposit of catalyst at a temperature in the range of about 400° to about 2000° F., preferably about 800° to about 1800°

F., for about 60 minutes to about 20 hours, preferably about 4 hours to about 12 hours. This activation at elevated temperatures can be done in several stages such as gradually heating the bed of catalyst particles to an intermediate temperature of approximately 400° to about 800° F. and holding the particles at that temperature for 30 minutes to 2 hours after which a higher temperature, e.g., 1400° F., is employed.

Catalysts activated in accordance with the present invention are extremely valuable in the polymerization and copolymerization of polymerizable olefins, especially aliphatic and cyclic olefins including both mono- and diolefins, for example, ethylene, butadiene, and the like. Among the examples of the preferred class of products which can be obtained in processes using this catalyst are homopolymers of ethylene, propylene, 1-butene, 1-pentene, and the like, and copolymers of ethylene and propylene, 1-butene, 2-butene, or butadiene, and the like. A preferred use for these catalysts is the polymerization of aliphatic monoolefins with a maximum of 8 carbon atoms per molecule and no branching nearer the double bond that the 4 position. Such a polymerization is ordinarily carried out at a temperature in the range of about 150° to 550° F., and the pressure can vary over a wide range, for example, from atmospheric to 1000 psia or above. It is preferred that a solvent be used which is liquid and inert under contacting conditions, such as cycloparaffinic hydrocarbons and paraffinic hydrocarbons having from 3 to 12 carbon atoms, for example, cyclohexane, n-pentane, isobutane, and the like. In such cases, the catalyst can be employed in a slurry form in the solvent, contacting the polymerizable material which is dissolved in the solvent, although fixed bed systems are also operable.

A better understanding of the invention may be had by referring to the accompanying drawings in which.

Figure 1:
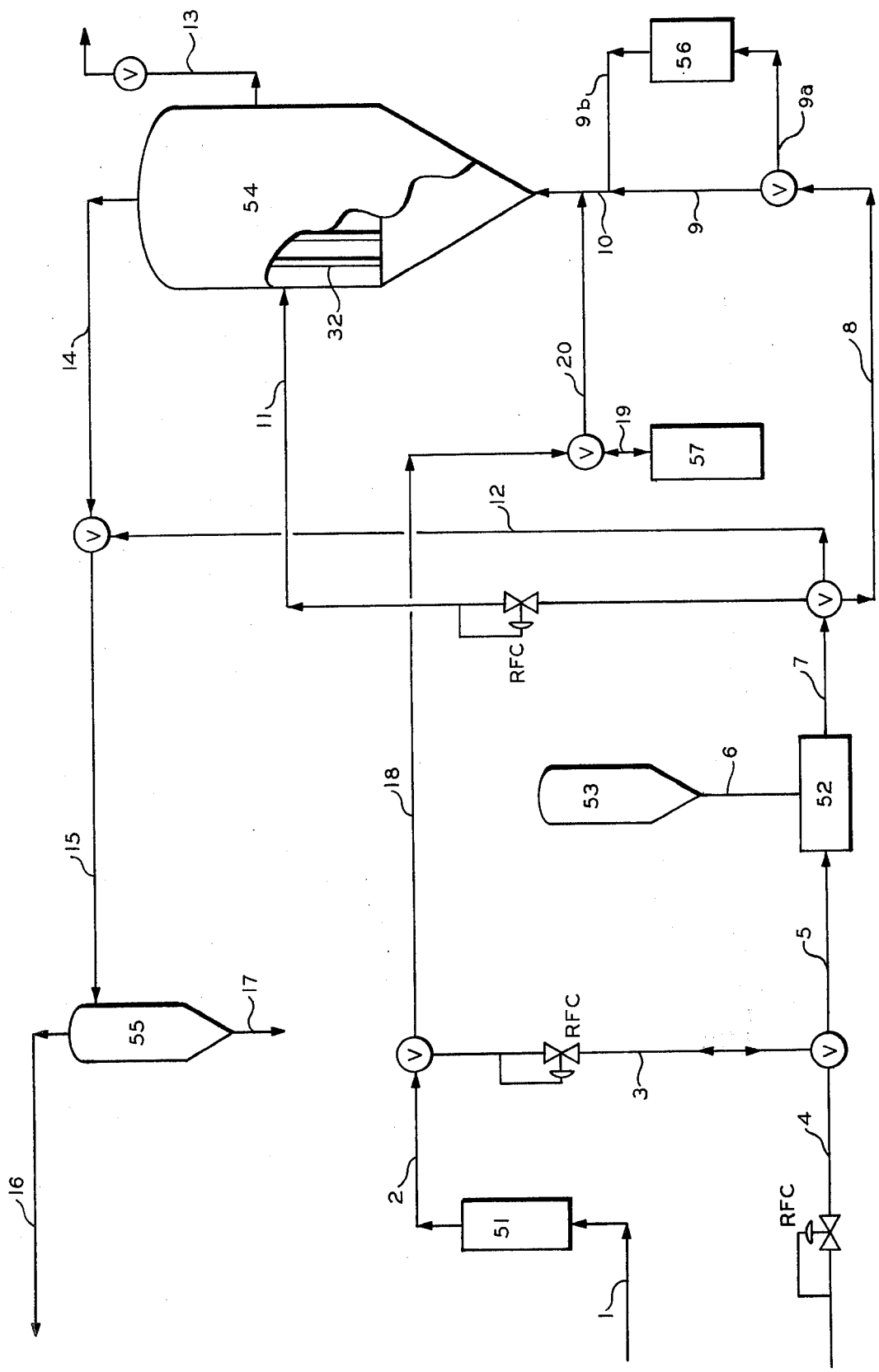
FIG. 1 is a flow diagram of a system embodying the invention.

Referring to the drawings in greater detail, particularly FIG. 1, an oxygen-containing catalyst activating stream, e.g., air, is introduced at ambient conditions through conduit 1 into drying zone 51. The substantially moisture-free stream exiting zone 51 is passed through conduits 2, 3, and 5 through mixing zone 52. Catalyst to be activated is introduced from catalyst storage 53 in a predetermined amount and rate through line 6 into mixing zone 52, which comprises a means for mixing particulate material and fluid streams, e.g., a venturi aspirator. After the predetermined amount of catalyst charge has been introduced into the mixing zone, further introduction of catalyst is terminated. The catalyst fed into zone 52 is mixed into and entrained by the catalyst activating stream and flows through lines 7, 8, 9, and 10 into catalyst activating zone 54; where the catalyst is deposited in a thin bed on one or more porous substrates or supports 32. The carrier fluid, i.e., catalyst activating stream, exiting activator 54 passes through line 13 and is discharged to the atmosphere.

After charging of the predetermined amount of catalyst to activator 54, the activating stream, which now carries no entrained catalyst, is bypassed around line 9 through line 9a into heating zone 56 where its temperature is raised to the desired activating temperature. The heated stream exiting heating zone 56 is passed through lines 9b and 10 into activator 54 and brought into contact with the catalyst deposited on supports 32. The activating stream passes through the shallow deposit of catalyst and then through the porous substrate before exiting the activator 54 through line 13.

At the conclusion of the activating treatment, the flow of heated activating stream is discontinued and an inert carrier fluid such as nitrogen is flowed through lines 4, 5, 7, and 11 into activator 54 and then through porous substrate 32 to dislodge the activated catalyst from the porous substrate 32. The velocity of the carrier fluid is such as to transport the catalyst particles which are then carried from activator 54 through lines 14 and 15 to catalyst recovery zone 55. In catalyst recovery zone 55, e.g., cyclone separator, the activated catalyst is separated from the carrier stream, and the catalyst is withdrawn from zone 55 through line 17 and passed to storage or charged directly to an operating unit. The carrier fluid is withdrawn from zone 55 through line 16 and recovered or otherwise disposed of.

To ensure proper fluidization of catalyst during the charging of activator 54, there can be provided a surge vessel 57, wherein a supply of activating stream, supplied through line 18, can be maintained under an elevated pressure and introduced as needed through lines 19 and 20 to the interior of activator 54 to entrain catalyst which may have accumulated in an undesirable fluidized state in the lower region of activator 54 adjacent the inlet thereof. If desired, the high pressure stream from vessel 57 can be used to purge activator 54 prior to and after each activation treatment. Alternatively, inert carrier gas can be introduced into the lower region using lines 3 and 18 as by exhausting vessel 57 of activating carrier fluid, providing a bypass around vessel 57 (not shown) or through line 20.

The system is provided with appropriate two-, three- and four-way valves V to provide for switching of streams and direction of flow in the manner set forth hereinbefore.

Figure 2:
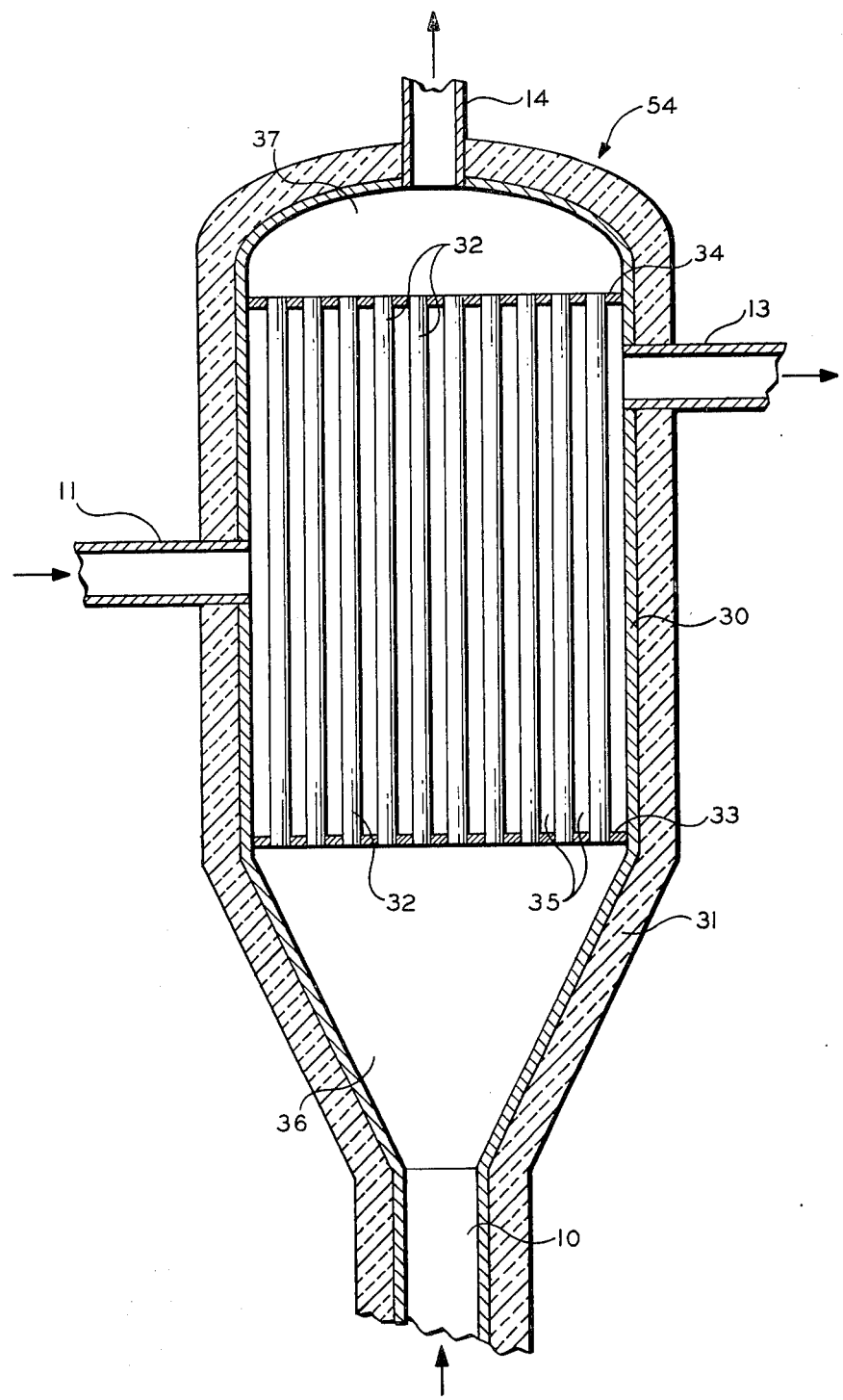
FIG. 2 is an enlarged detail drawing of a preferred catalyst activating vessel.

As shown in greater detail in FIG. 2, activator 54 is a vessel comprising a vessel shell 30, a first end chamber 36, a second end chamber 37 and an activating chamber positioned within said vessel between said first and second end chambers. Vessel shell 30 is formed from an appropriate heat-resistant material capable of maintaining its structural integrity at operating conditions, such as an Inconel alloy, with the exterior surface of the shell being covered with an insulating material 31 such as fiberglass, alumina, alumina-silica and the like. First end chamber 36 contains a first opening 10 whereby catalyst is charged to activator 54. The activating fluid is introduced and resulting activated catalyst can be withdrawn. Second end chamber 37 contains a second opening 14 whereby activated catalyst is withdrawn from activator 54. The activating chamber contains a plurality of porous substrates 32, which, in a preferred embodiment, are porous tubes constructed of sintered metal supported on a metallic screen. Porous substrates 32 are jointly and severally maintained in a fixed position by upper and lower seal plates 34 and 33, respectively. In addition, seal plates 33 and 34 isolate the spaces 35 between the porous substrates 32 from the first and second end chambers 36 and 37. The activating chamber further contains a third opening 13 whereby the activating stream is withdrawn from said activator 54; and a fourth opening 11 whereby a fluid suitable for disengaging activated catalyst from the porous substrates 32 is introduced.

In operation, the catalyst to be activated is transported in a fluidized state and introduced into activator 54 through first opening 10. The catalyst is emplaced in a shallow deposit on the inside surface of porous substrates 32. The heated activating stream is introduced into activator 54 and passes through the shallow deposit of catalyst particles which are maintained in a quiescent state on substrates 32 through substrate 32 into spaces 35 and exit vessel 54 through third opening 13. At the conclusion of the activation treatment, a fluid suitable for disengaging the now-activated catalyst from the porous substrates is introduced into activator 54 through fourth opening 11. The disengaging fluid passes sequentially through the spaces 35, through the porous substrate 32 and through the deposit of catalyst at a velocity sufficient to dislodge the catalyst particles, entrain the particles and transport the activated catalyst from activator 54 through opening 14 or alternatively through opening 10. If desired, additional disengaging fluid can be introduced through opening 10 to aid in transporting the activated catalyst.

In activating catalysts in accordance with the present invention, the particulate, i.e., granular, solid catalyst is introduced into a carrier stream, which is preferably a desired activating medium, and transported in a fluidized state to the activation zone. Within the zone, the catalyst particles are deposited, as by shutting off the flow of carrier stream or by pressure drop, on the porous substrate into a bed or layer of shallow depth, such depth being on the order of about 0.05 inch to about 1.0 inch, preferably in the range of about 0.1 inch to about 0.4 inch. The catalyst, now disposed as such shallow deposit, is contacted with the activating fluid at such temperature and for such time as to activate the catalyst to a desired level. The activating fluid passes sequentially through the deposit of catalyst particles and porous substrate so as to maintain the deposit in a static condition. After the activated catalyst particles are cooled, the particles are dislodged from the porous substrate by reversing the direction of flow so that the displacing medium, preferably an inert medium such as nitrogen gas, passes sequentially through the porous substrate and deposit of catalyst particles. The flow of displacing medium is such as to fluidize the catalyst particles which dislodge from the porous substrate, whereby the catalyst is transported from the activation zone to catalyst recovery.

Generally, the catalyst to be activated will be emplaced in the porous substrate to a shallow depth in the range of about 0.05 inch to about 1 inch, preferably in the range of about 0.1 to about 0.4 inch. The depth of the deposit is such as to limit the pressure drop across the bed to not more than 280 inches water column. Preferably, the pressure drop across the bed will be not more than 60 inches water column and, at present, it is desired that such pressure drop not exceed 15 inches of water column.

It is presently preferred that relatively high fluid velocities be employed during the activation treatment. Thus, the bed, which is maintained in a quiescent state, is contacted with the activating fluid at superficial velocities in the range of about 0.01 to about 10, preferably 0.05 to about 2, and preferentially about 0.1, feet per second.

As noted earlier, substantially any activating fluid known in the art can be used in the practice of the present invention. In activating the preferred olefin polymerization catalysts in accordance with this invention, air, oxygen, or an oxygen-containing stream are especially preferred. Where a carrier stream other than an activating fluid is employed to entrain and transport catalyst to the activator zone, it is preferred that such other carrier stream be an inert fluid such as nitrogen or carbon dioxide.

Fluids which can be used to dislodge and recover the activated catalyst particles include nitrogen and dry air.

Materials suitable for use as porous substrates are preferably sintered materials which retain their structural integrity at activation temperature, which have a pore size such that the substrate will not blind with catalyst fines, and which are resistant to oxidation at operating conditions which would result in a reduction in permeability. Representative of such materials are 316 stainless steel, Inconel and Hastelloy metals. A presently preferred porous substrate is Union Carbide UCAR SA 496B, which is formed by sintering Inconel 600 powder on Inconel 600 wire screen and which has a mean pore size of approximately 30 microns. Generally, the porous substrates can be formed from high melting alloys of nickel, iron, and at least one other metal selected from the group consisting of chromium, molybdenum, silicon, copper, and aluminum with alloys of nickel, iron, and chromium being especially preferred.

To further illustrate the invention, a catalyst was prepared by impregnating a coprecipitated gel composite consisting of 90 weight percent silica and 10 weight percent alumina with an aqueous solution of chromium nitrate. The total chromium trioxide content of the catalyst was 2.5 weight percent. The composite was dried and the thus-prepared catalyst was emplaced in a porous sintered metal screen to form a deposit having a thickness of 0.2 inch. This shallow deposit of catalyst particles was activated by contact with a heated air stream at a temperature of 1650° F. for 12 hours, using a superficial velocity of 0.1 fps. Catalyst following such treatment was suitable for the polymerization of ethylene to produce polyethylene. It has a very small reduction in chromium content while having the adsorbed water completely removed therefrom. Catalyst loss is minimal, i.e., virtually all catalyst charged to activator is recovered in an activated condition, in comparison to standard activation treatments wherein catalyst loss can approach values considerably in excess of 50 percent and are as high as 65 percent.

Reasonable variations and modifications are possible within the scope of this disclosure without departing from the spirit and scope thereof.

I claim:

1. Apparatus for activating a solid particulate catalyst deposited on the inner surface of a porous conduit, as hereinafter described, by passing an activating fluid through said catalyst deposit and said porous conduit, comprising, in combination:
   a. an upright vessel having a first lower end portion defining a first end chamber, an upper second end portion defining a second end chamber, and a middle portion defining an activating chamber;
   b. a plurality of porous conduits formed from a sintered metal positioned vertically within said activating chamber, said conduits being spaced apart from each other and spaced apart from the wall of said vessel, wherein said first end chamber is in communication with said second end chamber through the interior space of said conduits;

c. lower and upper seal plates for maintaining said porous conduits in a fixed position, whereby the spaces between said porous conduits are isolated from said first and second end chambers;

d. first conduit means in communication with said first end chamber for conveying a quantity of said catalyst entrained in said activating fluid, said quantity being sufficient to cover the inner surfaces of said porous conduits to a predetermined depth, and for thereafter conveying a stream of said activating fluid;

e. second conduit means in communication with said spaces in said activating chamber surrounding said porous conduits for exhausting said activating fluid;

f. third conduit means in communication with said spaces in said activating chamber surrounding said porous conduits for passing a stream of displacing medium thereto;

g. fourth conduit means in communication with said second end chamber for conveying a stream of said catalyst entrained in said displacing medium therefrom;

h. first valve means in said first conduit means;

i. second valve means in said second conduit means;

j. third valve means in said third conduit means;

k. fourth valve means in said fourth conduit means;

l. means in communication with said first conduit means for introducing a catalyst charge to said first conduit means whereby said catalyst is carried by said activating fluid into said first end chamber thence into said activating chamber and deposited on the inner surface of said porous conduits; wherein each of said first, second, third and fourth valve means has at least two positions, the first position of said first and second valve means being open and the second position being closed, and the first position of said third and fourth valve means being closed and the second position being open, whereby in the first valve position, said activating fluid flows through said first conduit means into said first end chamber thence into said activating chamber and through said catalyst deposit and said wall of said conduits into said spaces surrounding said conduits thence through said second conduit means; and whereby in said second valve position, said displacing medium flows through said third conduit means into said spaces surrounding said porous conduits thence through the walls of said porous conduits, thereby displacing said catalyst deposit therefrom, and carrying the thus-displaced catalyst into said second end chamber thence through said fourth conduit means.

2. The apparatus of claim 1 wherein said vessel (a) is cylindrical.

3. The apparatus of claim 1 wherein the exterior surface of said vessel is covered with an insulating material.

4. The apparatus of claim 1 further comprising means for heating said activating fluid.

* * * * *